Oct. 28, 1941.    P. ORR    2,260,863
TRANSMISSION SYNCHRONIZER
Filed June 8, 1940    2 Sheets-Sheet 2

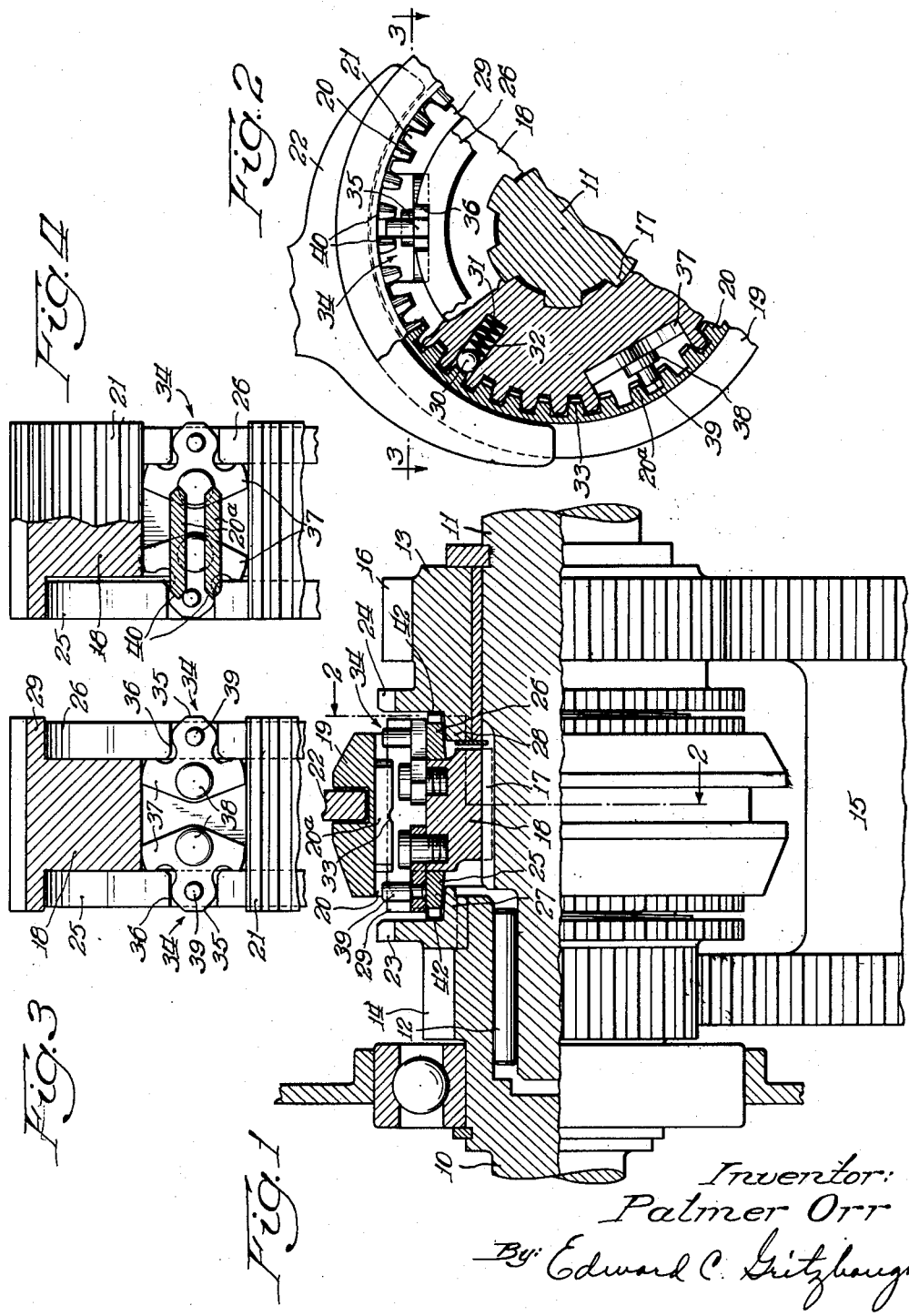

Inventor:
Palmer Orr
By: Edward C. Gritzbaugh
Atty.

Patented Oct. 28, 1941

2,260,863

UNITED STATES PATENT OFFICE 2,260,863

TRANSMISSION SYNCHRONIZER

Palmer Orr, Muncie, Ind., assignor to Borg-Warner Corporation, Chicago, Ill., a corporation of Illinois Application June 8, 1940, Serial No. 339,463

7 Claims. (Cl. 192—53)

This invention relates to synchronizing transmissions of the general type wherein a pair of torque transmitting members to be synchronized are adapted to be connected in positive drive relationship by means of a jaw clutch element drivingly connected to and axially slidable on one of the members to a positive drive connection with the other member, and wherein such movable jaw clutch element is adapted, in an initial stage of its movement toward positive drive position, to yieldingly urge a friction clutch or synchronizer element into frictional driving engagement with a coacting friction clutch element associated with such other member so as to initiate an operation in which the rotational speeds of the two members are synchronized so as to permit the positive drive connection to be established without clashing the teeth of the positive clutch elements. More particularly, the invention relates to a synchronizing transmission of this type, incorporating blocking means for impeding the advance of the movable positive clutch element until synchronization has been completed. In general, the invention has as its object to provide an improved means for performing this blocking operation, which is structurally independent of the synchronizer element so as to eliminate the necessity for forming the conventional blocker teeth on the synchronizer element.

Another object of the invention is to provide such a synchronizing transmission, wherein the blocker element serves the additional function of yieldingly transmitting thrust from the movable clutch element to the synchronizer element.

Another object of the invention is to provide a synchronizer of the type specified, wherein the blocker element serves the further function of providing a lost motion torque transmitting connection between the synchronizer element and the torque transmitting member with which it is associated.

Other objects, the advantages and uses of the invention will become more apparent after reading the following specification and claims, and after consideration of the drawings forming a part of the specification, wherein:

Fig. 1 is a side elevation, partially in axial section, of a synchronizing transmission embodying the invention;

Fig. 2 is a transverse sectional view of the same taken as indicated by the line 2—2 of Fig. 1;

Fig. 3 is a sectional view taken as indicated by the line 3—3 of Fig. 2;

Fig. 4 is a sectional view similar to Fig. 3, with the parts shown in energized position;

Figure 6:
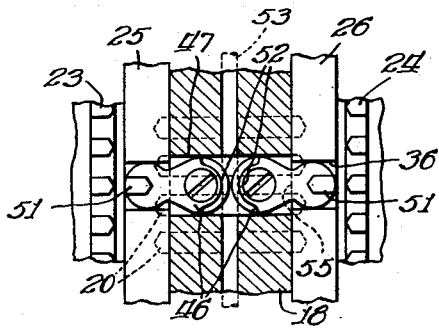
Fig. 6 is a plan view of the same with the movable jaw clutch sleeve removed, taken as indicated by the line 6—6 of Fig. 5.

As an example of one form in which the invention may be embodied, I have shown in Figs. 1 to 4 inclusive a synchronizing transmission embodying a pair of axially aligned torque transmitting shafts 10 and 11 to be synchronized, the forward end of the shaft 11 being piloted as at 12 in the rear end of the shaft 10. Rotatably mounted upon the shaft 11 is a third torque transmitting member 13 adapted to be driven at a reduced speed from shaft 10 through the medium of reduction gearing including a gear 14 on the shaft 10, a countershaft gear cluster 15, and a gear 16 on the torque transmitting member 13.

Splined upon the shaft 11, as at 17, is a torque transmitting member 18, commonly designated a hub. Encircling the hub 18 is a movable jaw clutch sleeve 19 having internal clutch teeth 20 meshing with external splines 21 on the periphery of the hub. Thus the sleeve 19 is axially slidable on the hub 18 and maintains a driving connection therewith. The sleeve 19 is adapted to be moved axially by a shifting fork 22. When shifted axially in one direction it is adapted to engage jaw clutch teeth 23 rigidly associated with the shaft 10, to establish a direct positive drive between the shaft 10 and the shaft 11 and when shifted in the other direction it is adapted to engage the positive clutch teeth 24 on the torque transmitting member 13 to establish a reduced positive drive between the shaft 10 and the shaft 11.

For synchronizing the speeds of the torque transmtting member 11 on the one hand and the members 10 and 13 on the other hand, I provide a pair of synchronizer rings 25 and 26 adapted to coact with friction clutch elements 27 and 28 fixedly associated with the members 10 and 13 respectively. The rings 25 and 26 are received in annular recesses defined within the rim portion 29 of the hub 18 and are adapted to oscillate and to move axially within limits, in said recesses.

The sleeve 19 is adapted to yieldingly transmit axial thrust to the hub 18 through the medium of poppet balls 30 mounted in holes 31 in the hub 18 and urged outwardly by coil springs 32 into engagement with teeth 20 of the sleeve 19. The teeth 20 are provided with notches 33 in which the balls 30 are adapted to seat when the sleeve is in a neutral position as shown in Fig. 1.

The yielding thrust thus received by the hub 18 from the sleeve is transmitted directly to a ring 25 or 26 depending on the direction of movement, and thus a synchronizer ring may be moved into initial engagement with its coacting cone 27 or 28 as the case may be. If the corresponding torque transmitting members 18 and 10 or 13 as the case may be are rotating asynchronously, this initial frictional engagement will tend to cause the synchronizer ring to rotate with its coacting cone. The synchronizer ring is allowed to oscillate within limits relative to the hub 18, such limits being determined by the blocker element indicated generally at 34 in Fig. 3.

The blocker element 34 is in the form of a double bell crank lever having a central arm 35 engaged in a notch 36 in the synchronizer ring, and having two lateral arms 37 adapted to transmit axial thrust to the synchronizer ring. Intermediate the arms 37, the blocker element is pivoted at 38 to the hub 18. The central arm 35 is provided with a radially projecting blocking lug or tooth 39 which, in the neutral position shown in Fig. 3 is adapted to be received between a pair of the teeth 20a of the sleeve 19, and which in the energized position shown in Fig. 4, is projected into the path of advance of one of the teeth 20a of the sleeve 19 so as to impede the shifting movement of the sleeve. The ends of the teeth 20a are preferably chamfered as at 40 so that axial pressure of the teeth 20a against the blocker lug 39 will urge the lug back toward its neutral position.

In operation, shifting pressure exerted by the fork 22 against the sleeve 19 will be transmitted through the poppet balls 30 to the hub 18 causing the latter to advance sufficiently to establish engagement between a synchronizer ring and its cooperating cone. Such engagement will cause the ring to oscillate around its pivot 38 until the blocker tooth 39 is interposed in the path of a tooth 20a. Such oscillating movement of the blocker element causes an arm 37 thereof to press against the synchronizer ring so as to urge it axially against its cooperating cone. Thus the synchronizing thrust will be built up with a servo action, the blocker element 34 reacting against the hub 18 and the latter in turn reacting against the sleeve 19 through the medium of the poppet balls 30. The total energized thrust is thus limited by the resistance of the springs 32, making it impossible for the servo action to proceed too far.

The spacing between the synchronizer rings 25, 26 and their cooperating cones is sufficient so that it is not possible for both rings to be energized simultaneously. If desired, annular retractor springs 42 may be interposed between the rings 25, 26 and the torque transmitting members 10, 13, for returning the synchronizer rings to disengaged position.

Figure 5:
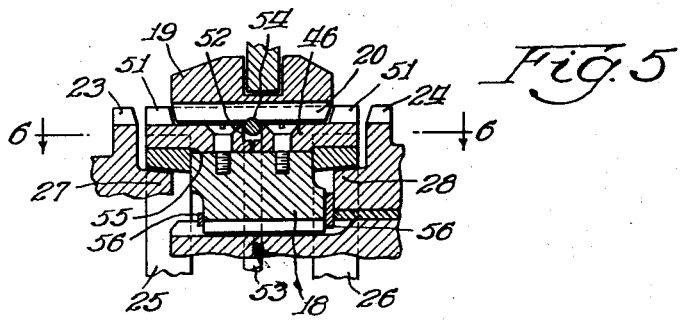
Fig. 5 is an axial sectional view of a modified form of the invention.

In the form of the invention shown in Figures 5 and 6, the blocker elements 46 have the functions of blocking, of transmitting thrust to the synchronizer rings, and of forming a lost motion drive connection between the synchronizer rings and the hub 18, but do not have the servo function. The blocker elements 46 are mounted in channels 47 in the periphery of the hub 18, their inner end regions being rounded and snugly embraced by the side walls of the channels 47 so as to fulcrum thereagainst, and being tapered toward their outer ends so as to permit of limited oscillation in the channels 47. The outer end regions 36 are engaged in notches 36 in the synchronizer rings 25 and 26 respectively. Projecting radially from the outer ends of the blocker elements are blocker teeth 51, adapted to be disposed in blocking relation to teeth 20 of the sleeve 19 when the blocker elements are at their limits of oscillating movement.

The blocker elements 46 have their inner ends notched as at 52 to receive a resilient thrust ring 53 which is adapted to engage in notches 54 in the teeth 20 of the sleeve 19 so as to yieldingly receive thrust therefrom. Such thrust is transmitted to the ends of the blocker elements 46 and from the blocker elements 46 to a synchronizer ring through the medium of shoulders 55 formed in the ends of the blocker elements.

The hub 18 is axially fixed on the shaft 11 between snap rings 56 recessed into the shaft 11. Other parts of the transmissions are the same as those shown in Figs. 1 to 4 inclusive, and are either indicated by the same numerals or are not illustrated.

In the operation of the synchronizing transmission shown in Figs. 5 and 6, axial movement of the sleeve 19 will be yieldably transmitted through the ring 53 to the ends of a set of blocker elements 46, thence from the shoulders 55 to a synchronizer ring 25 or 26, as the case may be. If the latter is not already in frictional torque receiving engagement with its cooperating cone, such axial thrust will establish initial frictional engagement causing the ring to be oscillated relative to the hub 18 until stopped by the engagement of the blocker elements 46 with one side or the other side of their channels 47. In this position, the blocker elements 46 form a torque transmitting connection between the synchronizer ring and the hub, so that the synchronizer ring may function to bring the speeds of rotation of the two members to be synchronized to a common speed. The blocker teeth 51 having been moved to blocking position by the oscillation of the synchronizer ring, further axial pressure against the jaw clutch sleeve 19 will be transferred from the teeth 20 to the teeth 51 and thence through the shoulders 55 to the synchronizer ring, and the yieldable torque transmitting connection afforded by the resilient ring 53, may be broken. As long as a difference in rotational speed exists between the two members to be synchronized, the blocker members will be maintained in the blocking position by the torque delivered from the synchronizer rings. As the rotational speeds are synchronized, however, the blocker elements will finally be allowed to return to their neutral positions permitting the movable clutch sleeve 19 to pass on into clutch engagement with the jaw clutch teeth 23 or 24 as the case may be.

Figure 8:
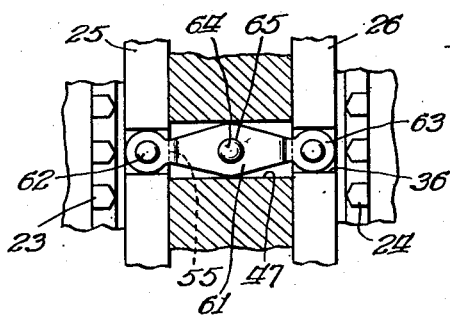
Fig. 8 is a plan view of the same with the movable jaw clutch sleeve removed.
Figure 7:
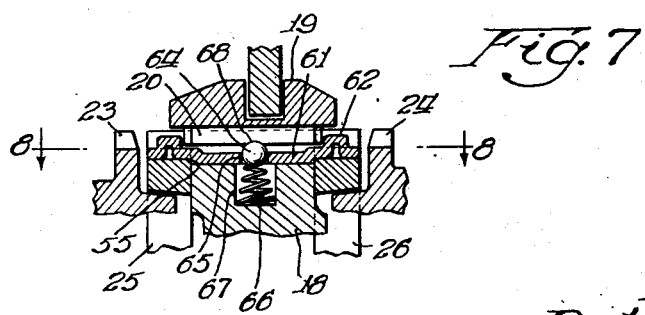
Fig. 7 is an axial sectional view of a further modification of the invention.

In the form of the invention shown in Figs. 7 and 8, the blocker elements 61 are in the form of bars extending the full length of the channels 47 and having blocker teeth 62 at each end. The bars 61 are narrowed from their central region to their end regions so as to permit oscillating movement within the channels 47, and are provided at their ends with rounded heads 63 engaged in notches 36 in the synchronizer rings 25 and 26 respectively.

The shoulders 55 by means of which the bars are adapted to exert thrust against the rings 25 and 26 may be formed in a die stamping operation as may also the teeth 62.

A suitable yieldable thrust receiving connection between each bar 61 and the movable jaw clutch sleeve 19 is provided. In order to facilitate oscillating movement of the bar 61, this thrust receiving connection may be in the form of a ball 64 received in an opening 65 in the bar 61 and urged outwardly by a spring 66, mounted in a recess 67 in the hub 18 into yielding engagement with a notch 68 in a tooth 20 of the sleeve 19. The remaining parts of this form of the invention are the same as those described in the preceding form of the invention and the operation is the same as in the form described in Figs. 5 and 6 with the exception that when one end of the bar is biased in one direction by the initial frictional clutching action of the synchronizer ring coacting with that end, the other end of the bar will of course be moved in the opposite direction, moving its coacting synchronizer ring in the same direction. This latter movement may be utilized to break the connection between the latter synchronizer ring and its cooperating cone if these parts should happen to be stuck together.

While I have described my invention in connection with certain specific embodiments thereof, it is to be understood that this is by way of illustration and not by way of limitation and the scope of my invention is defined solely by the appended claims.

I claim:

1. In a synchronizing transmission, a pair of torque transmitting members to be synchronized, a jaw clutch element drivingly connected to and axially shiftable relative to one of said members into positive driving connection with a jaw clutch element drivingly connected to the other member, a synchronizer element drivingly connected to said one member and adapted under axial pressure to establish a frictional synchronizing connection with said other member and an element pivoted to said one member and carrying blocking means, said element being associated with said synchronizer element so as to be moved thereby, when said members are rotating asynchronously, to a position blocking axial advance of said positive clutch element.

2. In a synchronizing transmission, a pair of torque transmitting members to be synchronized, a jaw clutch element drivingly connected to and axially shiftable relative to one of said members into positive driving connection with a jaw clutch element drivingly connected to the other member, a synchronizer element drivingly connected to said one member and adapted under axial pressure to establish a frictional synchronizing connection with said other member and an element having pivotal connection with said synchronizer element and pivoted to said first member so as to permit limited oscillating movement of said synchronizer element relative to said first member, and having blocking means adapted, in one position of said oscillating movement to block advance of said positive clutch element until synchronization is substantially completed.

3. In a synchronizing transmission, a pair of torque transmitting members to be synchronized, a jaw clutch element drivingly connected to and axially shiftable relative to one of said members into positive driving connection with a jaw clutch element drivingly connected to the other member, a synchronizer element drivingly connected to said one member and adapted under axial pressure to establish a frictional synchronizing connection with said other member, said one member having in its periphery a longitudinally extending channel, said synchronizer element having a notch adapted to register with said channel, and a blocker element mounted in said channel for circumferential swinging movement limited by contact with the sides of the channel, having an end region engaged in said notch and provided with a radially projecting blocker tooth adapted to be disposed in blocking relation to said movable clutch element by oscillation of said synchronizer element, under frictional connection with said other member, to the limit of movement of said blocker element in its channel.

4. A synchronizing transmission as defined in the preceding claim, wherein said blocker element is arranged to yieldably transmit thrust from said movable clutch element to said synchronizer element to insure a frictional connection between the latter and said other member preparatory to synchronizing.

5. A synchronizing transmission as defined in claim 3, wherein said blocker element has a yieldable thrust receiving connection with said movable jaw clutch element and a positive thrust transmitting connection with said synchronizer element.

6. A synchronizing transmission as defined in claim 2, wherein said pivoted element has a yieldable thrust receiving connection with said movable jaw clutch element.

7. In a synchronizing transmission, a pair of torque transmitting members to be synchronized, a jaw clutch element drivingly connected to and axially shiftable relative to one of said members into positive driving connection with a jaw clutch element drivingly connected to the other member, a synchronizer element drivingly connected to said one member and adapted under axial pressure to establish a frictional synchronizing connection with said one member, and a servo element pivotally connected with said synchronizer element and pivotally fulcrumed on said one member for swinging movement in a plane tangential to its circumference of revolution and having a member adapted to transform torque developed between said one member and said synchronizer element into axial thrust against said synchronizer element, said servo element carrying blocking means adapted when it is in an energized position, to impede advance of said movable clutch element.

PALMER ORR.